United States Patent [19]

Bolinger

[11] 3,771,019

[45] Nov. 6, 1973

[54] FLASHER CIRCUIT

[75] Inventor: John F. Bolinger, Michigan, Ind.

[73] Assignee: Meridian Industries Inc., Southfield, Mich.

[22] Filed: June 23, 1972

[21] Appl. No.: 265,942

[52] U.S. Cl. ................ 315/200 A, 315/77, 315/81, 315/225

[51] Int. Cl. ........................................ H05b 37/00

[58] Field of Search ............ 315/77, 83, 81, 200 A, 315/225; 340/55

[56] References Cited

UNITED STATES PATENTS 3,329,868 7/1967 Domann et al. .................... 315/225

3,452,248 6/1969 Leeder, Jr. ...................... 315/200 A

*Primary Examiner*—Roy Lake

*Assistant Examiner*—Lawrence J. Dahl

*Attorney*—Paul J. Ethington et al.

[57] ABSTRACT

A flasher circuit is disclosed for intermittently energizing a lamp load such as the turn signal lamps of an automotive vehicle. The circuit operates in the manner of a relaxation oscillator and comprises a resistance capacitance timing circuit, a bistable trigger circuit controlled thereby, and a load switching means which in one embodiment is a power transistor and which in another embodiment is a relay switch. In the standby condition the bistable trigger circuit is held in one stable state with the switching means open and the lamp load is deenergized. When the turn signal switch is closed the timing circuit alternately switches the trigger circuit from one state to the other to flash the lamp load.

6 Claims, 2 Drawing Figures

FLASHER CIRCUIT

This invention relates to flasher circuits for lamps and more particularly to such devices especially adapted for use in automotive vehicles.

Flasher circuits are known which utilize electronic oscillators as the timing device for control of energization of the lamp load. Such electronic oscillators typically employ transistors and the periodic control signal of relatively low level produced thereby is applied to a driver amplifier which in turn actuates a power switching device. The power switching device is adapted to connect the lamp load across the voltage source to energize the lamps and it is also coupled back to the timing circuit to terminate one portion of its cycle and initiate the other portion. Thus the circuit operates in the manner of a relaxation oscillator and the timing circuit thereof is typically a resistor capacitor time constant circuit in the input of a bistable trigger circuit which suitably comprises a pair of transistors.

A difficulty encountered in practice with this type of flasher circuit is the instability of the timing circuit. The flash rate stability is of particular importance in such applications as automotive turn signal flashers and is known to be sensitive to supply voltage variations and temperature variations.

In accordance with the present invention, a flasher circuit especially adapted for use in automotive vehicles is provided which exhibits an exceedingly high degree of stability of flash rate despite variations in voltage supply and ambient temperature. This is accomplished by an improved timing circuit which is held in a stable standby condition and which is provided with partial isolation from the trigger circuit throughout all modes of operation. Further, in accordance with this invention, the flasher circuit is rendered substantially immune to noise voltages which may be imposed upon the supply voltage line with the result that false operation of the power switching device is eliminated or minimized. This is accomplished by means of selective coupling of the input circuits of the transistors in the bistable trigger circuit which may be combined with selective filtering in the input circuit.

A more complete understanding of this invention may be obtained from the detailed description which follows, taken with the accompanying drawings in which.

Figure 1:
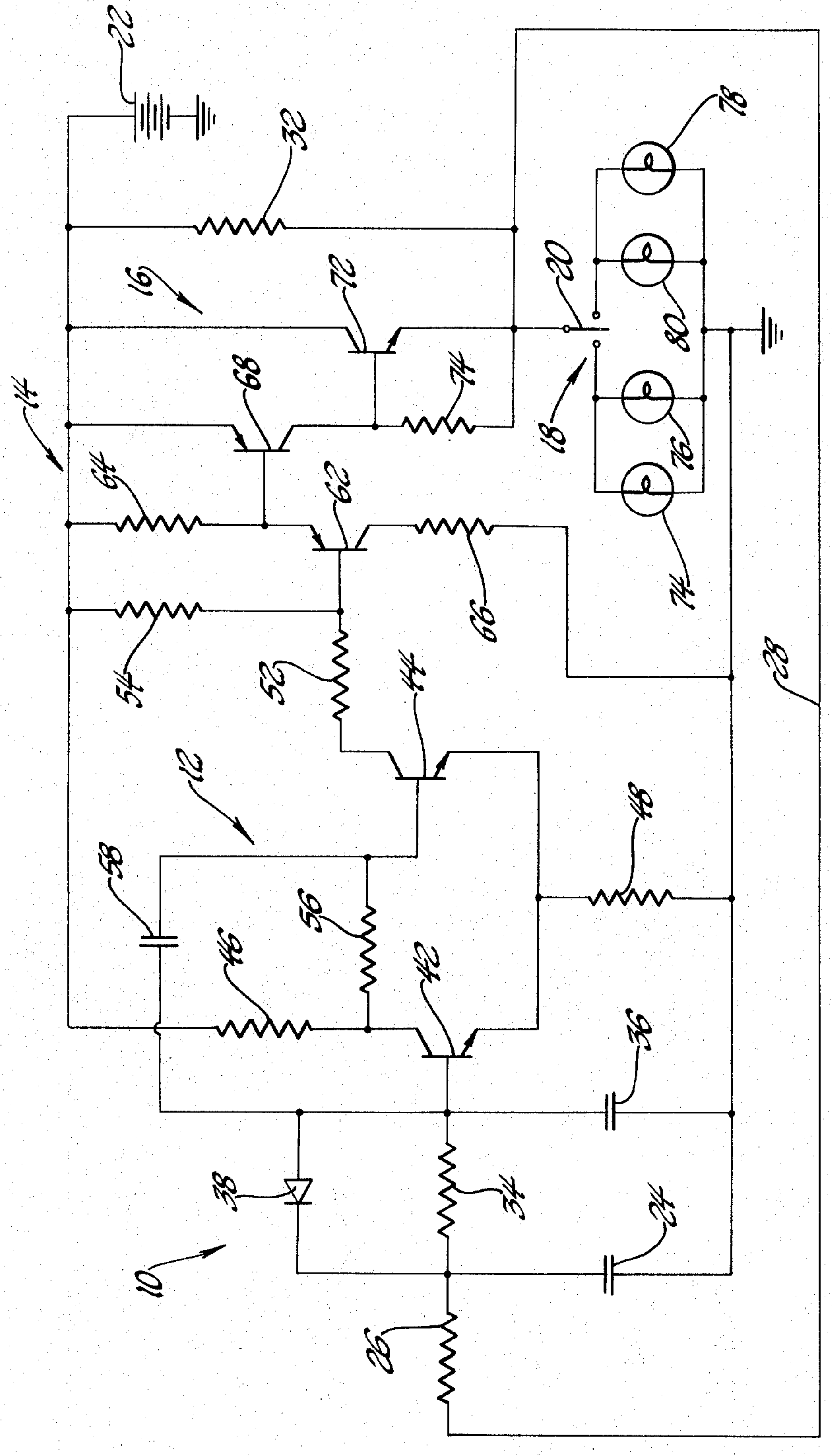
FIG. 1 is a schematic diagram of the inventive flasher circuit.

Referring now to the drawings, there is shown an illustrative embodiment of the invention in a flasher circuit especially adapted for use with the turn signals of an automotive vehicle. As shown in FIG. 1, the flasher circuit comprises, in general, a timing circuit 10 adapted to control a bistable trigger circuit 12 which produces a switch control signal. The switch control signal is applied through a buffer amplifier 14 to an electrically actuated switching means 16 which in turn is adapted to connect a lamp load 18 through a manually actuated switch 20 to a voltage source 22, such as the vehicle battery.

Referring to the circuit in greater detail, the timing circuit 10 comprises a time constant circuit including a timing capacitor 24, having one terminal connected to ground and the other terminal connected through a timing resistor 26, conductor 28 and a series resistor 32, to the positive terminal of the voltage source 22 which has its other terminal connected to ground. The timing resistor 26, together with the timing capacitor 24, determines the flash rate of the flasher circuit as will appear hereinafter. The resistor 32 has a resistance value which is low enough to allow transistor 42 to be operated in saturation but which is large relative to the load so that the lamps are not heated to incandescense by the current therethrough. The timing voltage developed across the capacitor 24 is applied through an isolation resistor 34 to the input of the bistable trigger circuit 12. A shunt filter capacitor 36 is connected across the input of the trigger circuit to bypass high frequency spike voltages which may be imposed through the power supply line or otherwise introduced to the input of the trigger circuit 12. A protective diode 38 is connected in parallel with the isolation resistor 34 as an additional measure in eliminating transient voltages from the input of the trigger circuit and is especially desirable on vehicles utilizing an inverter connected with the voltage source 22 for supplying fluorescent lamps.

The bistable trigger circuit 12 comprises transistors 42 and 44 connected in a Schmitt circuit of conventional design. Transistor 42 has its collector connected through a collector resistor 46 to the positive terminal of the voltage source 22 and its emitter is connected through a common resistor 48 to ground. The base of the transistor 42 is connected to the junction of the isolation resistor 34 and the filter capacitor 36 and hence sees the voltage across the timing capacitor 24. The transistor 44 has its collector connected through a coupling resistor 52 and collector resistor 54 to the positive terminal of the voltage source 22, and has its emitter connected through the common resistor 48 to ground. The base of transistor 44 is connected through a coupling resistor 56 to the collector of transistor 42. The base of transistor 42 is connected with the base of transistor 44 through a coupling capacitor 58 which, of course, blocks the control voltage developed on the timing capacitor 24 but is adapted to pass high frequency noise pulses so that both transistors respond thereto without false triggering.

The output of the bistable trigger circuit 12 is applied to the input of the driver amplifier 14 which comprises a transistor 62. The transistor 62 is of the PNP type and has its input or base connected directly to the junction of resistors 52 and 54. The emitter of transistor 62 is connected through resistor 64 to the positive terminal of the voltage source 22 and the collector is connected through a resistor 66 to ground.

The output of the driver stage 14 is applied to the input of the switching means 16 which comprises the combination of transistors 68 and 72 which are of the PNP and NPN types respectively. It will be appreciated that these two transistors function in a switching mode in the same manner as a single high current PNP transistor which could be connected to replace them. The transistor 68 has its base connected directly to the emitter of the driver transistor 62 and its emitter is connected directly to the positive terminal of the voltage source. The collector of transistor 68 is connected to the base of transistor 72 which has its collector connected directly to the positive terminal of the voltage source. The emitter of transistor 72 constitutes the output of the switching means 16, and is connected with the movable contact of the manually actuated switch 20. A resistor 75 is connected between the base and emitter of transistor 72.

The load 18 comprises vehicle lamps connected in parallel between the switch 20 and ground. The load suitably includes front and rear turn signal lamps 74 and 76 respectively connected between one fixed contact of the switch 20 and ground. It also comprises front and rear turn signal lamps 78 and 80 respectively, connected between the other fixed contact of switch 20 and ground.

In operation of the flasher circuit of FIG. 1 the manual turn signal switch 20 is normally in the neutral or center position as shown and the circuit is in a standby condition. The circuit disclosed is adapted for operation in an automotive vehicle with a nominal 12 volt supply which, under varying conditions of use, may vary from about 11 volts to 15 volts. It is capable of holding a substantially constant flash rate of approximately 90 flashes per minute with a variation of plus or minus 10 flashes per minute over this supply voltage range and the variations in ambient temperature normally encountered. The flasher circuit is preferably adjusted to provide equal on and off times for the lamps being flashed.

In the standby condition of the flasher circuit the timing capacitor 24 is charged from the voltage source 22 through the resistor 32 and timing resistor 26. The timing capacitor 24 is partially isolated from the base input of transistor 42 by the isolation resistor 34. The base input draws enough current to hold transistor 42 fully conductive, i.e., saturated, but the isolation resistor keeps the timing circuit from being unduly loaded. The standby current drain is that drawn by transistor 42 and is of small value. The trigger circuit 12 is adapted to be triggered at approximately 8 volts on the base of transistor 42 and accordingly the transistor 42 is conductive and transistor 44 is held nonconductive. With transistor 42 conductive, the base of transistor 44 is held at substantially the same voltage as the emitter by virtue of the common resistor 48 and the coupling through resistor 56. Thus the coupling of the transistors ensures that one will be completely cut off when the other is conductive and vice versa with the circuit being triggered from one stable condition to the other in a positive, fast-switching manner. The trigger circuit 12 is substantially immune to noise voltages on the input by virtue of the coupling capacitor 58 and the shunt filter capacitor 36. The output of the trigger circuit 12 in the standby condition is a relatively high positive voltage at the collector of transistor 44. This is applied to the base of the driver transistor 62, which is thereby held nonconductive. Accordingly, the relatively high positive voltage at the emitter thereof is applied to the base of transistor 68 in the switching means 16, which is also held nonconductive. Consequently, there is no forward bias on the transistor 72 since both base and emitter thereof are held at substantially the same voltage as the timing capacitor through the conductor 28. Accordingly, the flasher circuit in the standby condition is held in a stable inactive state ready for operation of the turn signal switch 20. The timing capacitor is maintained in its charged state through a charging circuit which includes a resistor 32, timing resistor 26 and the capacitor 24 connected across the voltage source 22.

When the manual turn signal switch 20 is closed against either of the fixed contacts, the timing capacitor 24 is connected in a discharge circuit, i.e., a circuit which includes the timing resistor 26 and the lamp load. Consequently the capacitor 24 will discharge and after about 330 milliseconds will reach a relatively low voltage of approximately 1 volt and the trigger circuit 12 will be triggered to its other stable state with transistor 42 cut off and transistor 44 fully conductive. During the discharge of the timing capacitor the switching means 16 remains open and in this first portion of the flasher cycle the lamp load is deenergized. However, when the trigger circuit changes state the driver transistor 62 of stage 14 is switched on. This causes the transistor 68 to be forwardly biased through transistor 62 and consequently the supply voltage is applied through transistor 68 to the base of transistor 72, causing it to become fully conductive through its output circuit Thus the full supply voltage is applied through the output circuit of transistor 72 to the lamp load which is thereby energized during the second portion of the flasher cycle.

With the lamp load energized by the supply voltage during the second portion of the flasher cycle the full supply voltage is also applied through a charging circuit, i.e., a circuit extending through conductor 28 and timing resistor 26 to the capacitor 24. As a result the control voltage across the capacitor 24 increases to the trigger level of transistor 42 of the trigger circuit 12 in a period of about 330 milliseconds. Transistor 42 thus becomes conductive and transistor 44 is switched off. This in turn causes the driver transistor 62 to be cut off and simultaneously transistors 68 and 72 of the switching means 16 are cut off. Thus the capacitor 24 is again connected through the discharge circuit including timing resistor 26, conductor 28 and the lamp load to ground which terminates the second portion of the flasher cycle during which the lamps are energized. The connection of the discharge circuit also marks the initiation of the first portion of the next flasher cycle which is followed by the second portion thereof in the manner just described and of course the flasher circuit operates cyclically in this manner until the manual turn signal switch 20 is reset to its neutral position.

Figure 2:
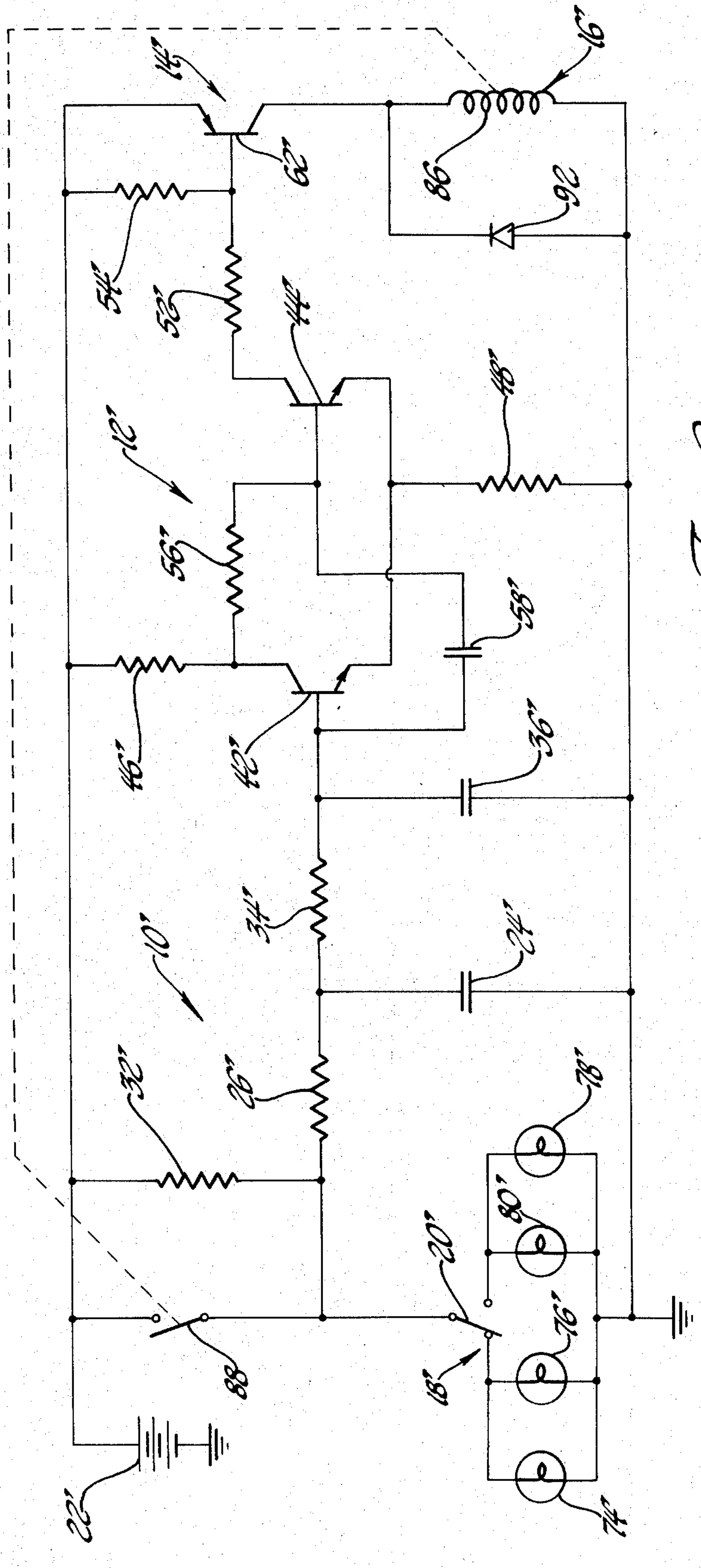
FIG. 2 is a schematic diagram of a modification of the flasher circuit.

Referring now to FIG. 2, a modification of the inventive flasher circuit is shown which utilizes an electromechanical or relay switching means 16′ instead of the solid state or transistor switching means 16 of FIG. 1. The circuit of FIG. 2 is similar to that of FIG. 1 in many respects and to avoid undue repetition those portions of the circuit which are the same will not be described in detail. For convenience the components of the circuit in FIG. 2 which correspond to and are the same type as those shown in the circuit of FIG. 1, are identified with a reference character which is the same except that a prime symbol is added. Thus the flasher circuit of FIG. 2 comprises a timing circuit 10′ which is the same configuration as previously described and which supplies a control signal to a bistable trigger circuit 12′ which is also the same configuration as previously described. The trigger circuit develops a switching signal voltage which is applied to a driver circuit 14′ which comprises a driver transistor 62′. The driver transistor 62′ controls the energization of the electrically actuated switching means 16′. The switching means in this embodiment comprises an input energizing coil 86 and a relay switch 88 actuated thereby and which is normally open. The driver transistor 62′ has its emitter connected with the supply voltage source 22′ and its collector is connected through the coil 86 to ground. A diode 92 is connected across the coil 86 to protect the transistor circuit from the inductive kick of the coil 86. The relay switch 88 is connected in series with the manual turn signal switch 20' and the lamp load across the voltage source 22'.

The operation of the flasher circuit of FIG. 2 is analogous to that of FIG. 1 and will be described briefly. When the manual turn signal switch 20' is in the neutral position, as indicated, the flasher circuit is in the standby condition. Consequently, the timing capacitor 24' is charged through the resistor 32' and the timing resistor 26' to a trigger level which causes the transistor 42' of the trigger circuit to be conductive. Consequently, the transistor 44' of the trigger circuit and transistor 62' of the driver stage are both nonconductive and the relay coil 86 is deenergized. Thus the relay switch 88 is open and the lamp load is deenergized.

When the manual turn signal switch 20' is actuated so that it is closed against either of the fixed contacts, the timing capacitor 24 is connected in the discharge circuit through the timing resistor 26' and the lamp load. Accordingly, the first portion of the flasher cycle with the lamp load deenergized is initiated and the control voltage drops below the trigger level and transistor 42' of the trigger circuit becomes non-conductive. As a result, transistor 44' becomes conductive and the driver transistor 62' becomes conductive. With the driver transistor 62' conductive the full supply voltage of source 22' is applied therethrough across the relay coil 86 to energize the same. Consequently, the relay switch 88 is closed and the lamp load is energized with the full value of the voltage source 22'. This initiates the second portion of the flasher cycle during which the timing capacitor 24' is connected in the charging circuit across the voltage source 22' through the relay switch 88 and the timing resistor 26'. When the timing capacitor 24' has reached the trigger level voltage, the trigger circuit 12' is switched to its other stable state with transistor 42' conducting and transistor 44' cut off. This cuts off the driver transistor 14' and deenergizes the relay coil 86. Accordingly, the relay switch 88 is opened and the lamp load is deenergized. This terminates the second portion of the flasher cycle and simultaneously initiates the first portion of the next flasher cycle. The flasher circuit operates in repetitive cyclical manner as just described until the manual turn signal switch 20' is returned to its neutral position.

Although the description of this invention has been given with respect to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. A flasher circuit for lamp comprising a voltage source, a timing capacitor and an isolation resistor, a bistable trigger circuit, said timing capacitor being connected across the input of the trigger circuit through said isolation resistor; a first charging circuit including a current limiting resistor and a timing resistor connected in series with the voltage source across the timing capacitor to provide a standby input current for the trigger circuit, said current limiting resistor being small enough so that said input current is sufficient to hold the trigger circuit in a first stable state, a lamp load, manually actuated switching means connected in series with the load, an electrically controlled switching means having an input circuit and an output circuit, the output circuit being connected in series with the load, said voltage source and said manually actuated switching means, a driver amplifier having an input connected with the output of the trigger circuit and an output connected with the input circuit of said electrically controlled switching means, a discharge circuit connecting said timing capacitor across said load through the manually actuated switch when it is closed to thereby initiate flashing of the lamp load by discharging the capacitor to switch the trigger circuit to its second stable state and close the electrically controlled switching means, and a second charging circuit connecting said voltage source across said timing capacitor through the electrically controlled switching means when it is closed whereby the lamp load remains energized until the timing capacitor is charged sufficiently to switch the trigger circuit back to its first stable state and thereby opens the electrically controlled switch, said current limiting resistor being large enough so that current therethrough is insufficient to light the lamps, whereby said discharge circuit is effectively reconnected and the flashing of the lamp load is repeated as long as the manually actuated switch is closed.

2. The invention as defined in claim 1 including a filter capacitor connected across the input of the trigger circuit.

3. The invention as defined in claim 1 wherein said electrically controlled switch means is a relay.

4. The invention as defined in claim 1 wherein said electrically controlled switch means is a transistor.

5. The invention as defined in claim 1 wherein said trigger comprises two transistors, the emitters of said two transistors being connected together and being connected through a common resistor to one terminal of the voltage source, the collectors of said two transistors being connected to the other terminal of the voltage source, the base of the first of said two transistors being connected with said isolation resistor and the base of the second of said two transistors being connected with the collector of the first of said two transistors.

6. The invention as defined in claim 5 including a capacitor connected between the bases of the two transistors of the trigger circuit to eliminate the effect of noise pulses.

* * * * *